Patented Sept. 20, 1949

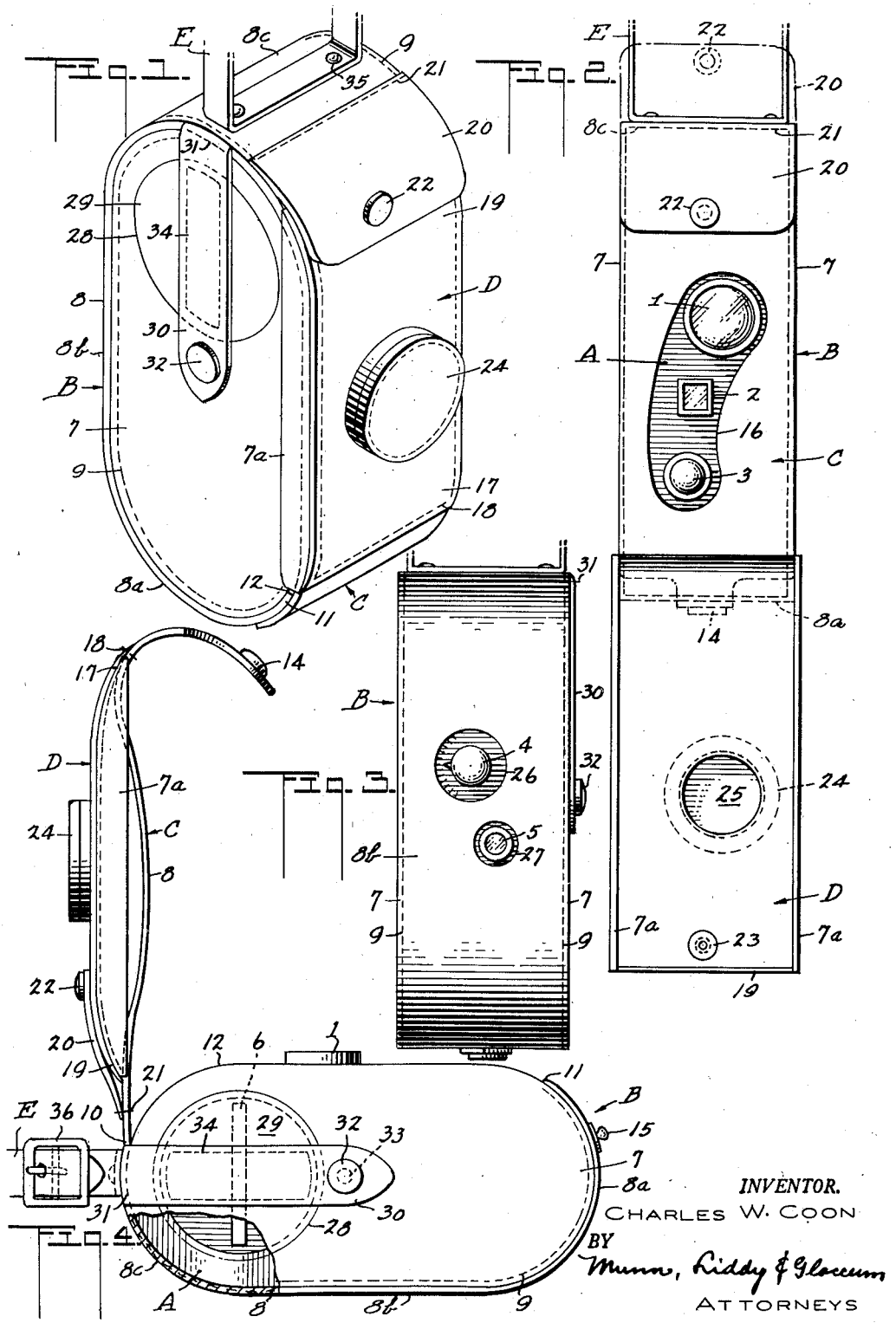

2,482,248

UNITED STATES PATENT OFFICE 2,482,248

MOTION-PICTURE CAMERA CASE

Charles W. Coon, Berkeley, Calif.

Application January 28, 1947, Serial No. 724,735

5 Claims. (Cl. 150—52)

The present invention relates to improvements in a motion picture camera case. It consists of the combinations, constructions and arrangement of parts hereinafter described and claimed.

An object of my invention is to provide a case that is arranged to house a camera; and which is designed to expose those parts of the camera that must be uncovered for taking pictures while the camera remains in the case. Thus the camera is ready for instant use, without the necessity of removing the camera. At the same time, the case protects the camera from the weather or defacing. The arrangement removes the danger of dropping the camera, which is always present when a camera must be removed from its case for use.

It is proposed in this invention to provide a case for a camera, which is fashioned with cut-away areas positioned to expose the camera parts that must be uncovered during the taking of pictures.

A still further object is to provide a case of the character described, which will receive a motion picture camera. The essential operating parts of the camera, such as the lens, front and rear viewing windows, speed regulator, operating button and the winding mechanism, are exposed through the case. In this manner, motion pictures may be taken without removing the camera from its case.

Other objects and advantages will appear as the specification continues, and the novel features of my invention will be set forth in the appended claims.

For a better understanding of the invention, reference should be had to the accompanying drawings, forming part of this application, in which:

Figure 1 is an isometric view of a motion picture camera case constructed in accordance with my invention;

Figure 2 is a front elevation of the case showing the outer or auxiliary cover in open position and disclosing portions of the camera;

Figure 3 is a rear elevation of the camera case; and

Figure 4 is a side elevation of the case with parts in section, and also illustrating the inner and outer covers raised to allow the camera to be removed from its case.

While I have shown only the preferred form of my invention, it should be understood that various changes, or modifications, may be made within the scope of the appended claims without departing from the spirit thereof.

Referring to the drawing in detail, I disclose a motion picture camera indicated generally at A. The particular type of commercial camera that I have chosen for illustration has a lens 1, front viewer 2 and an operating button 3 arranged on the front thereof. The back of the camera includes a speed regulator 4 and a rear viewer 5. It will be understood that the photographer looks into the rear viewer and observes through the window 2 the object being photographed. The side of the camera has a wind-up handle 6 (see Figure 4).

The motion picture camera is housed in a case designated generally at B. The case includes spaced-apart sides 7 having a strip of material 8 stitched thereto, as at 9. This strip forms a bottom 8a, back wall 8b and partial top 8c for the case. It will be noted from Figure 4 that the strip of material is not stitched to the sides 7 above the points 10 and 11. This arrangement defines an opening 12 in the front of the case through which the camera may be inserted into the case or withdrawn therefrom.

The extended end of the strip of material 8 provides a main or inner cover indicated generally at C, which may be lowered to form a closure over the opening 12, as illustrated in Figure 1. The free end of the main or inner cover has a snap fastener 14 that may be engaged with a stud 15 disposed on the bottom 8a.

The main cover C is fashioned with a cut-away area 16 of the shape shown in Figure 2 so as to expose the lens 1, front viewing window 2 and operating button 3. An outer or auxiliary cover D has its end 17 swingably secured to the main or inner cover C by stitching 18. The free end 19 of the outer cover is insertable under a flap 20. The latter is stitched to the strip 8, as at 21, and carries a snap fastener 22 that is engageable with a stud 23 disposed on the outer cover D (see Figure 2). The outer cover carries pieces 7a that fit over the sides 7, as shown in Figure 1. These pieces serve as stiffeners for the cover D. When the snap fastener 22 is disengaged from its stud 23, the outer or auxiliary cover D may be lowered for exposing the slot 16. Accordingly, the lens 1, front viewing window 2 and operating button 3 are exposed. The flap 20 not only serves to hold the outer cover over the inner cover, but also acts as a shield to prevent rain from gaining access to the interior of the case. The outer or auxiliary cover D has a lens hood 24 having a socket 25 for fitting over the lens of the camera.

The back wall 8b has cut-away areas 26 and 27 that expose the speed regulator 4 and rear viewer 5, respectively (see Figure 3). Referring to Figures 1 and 4, it will be seen that the side wall 7 confronting the wind-up handle 6 is provided with an opening 28. A disc 29 may be introduced into this opening for closing the latter. Upon withdrawing the disc, the wind-up handle is exposed for operation.

A strap 30 has one end thereof stitched to the side 7 in which the opening 28 is formed, and this stitching is designated at 31. The opposite end of this strap has a snap fastener 32 that is engageable with a stud 33 on one of the sides 7. The disc 29 is stitched at 34 to an intermediate portion of the strap 30.

The top of the case B is provided with the usual shoulder strap E, which is anchored to the case by rivets 35, or other suitable fastening means. Such a strap may include a buckle 36 so that the length of the strap may be adjusted.

In the "Bell and Howell" camera now on the market, a footage counter and speed indicator (not shown) are arranged on the same side as the wind-up handle 6. The "Revere" camera has a footage counter, focus adjustment and operating trigger disposed on the side of the camera on which the wind-up handle is located. It is obvious that cut-away areas may be provided on cases designed for these particular types of cameras to allow the footage counter, speed indicator, focus adjustment and operating trigger to be exposed while the cameras remain in their cases.

Having thus described the various parts of my motion picture camera case, the operation thereof may be briefly described as follows:

Assuming that the camera A is housed in the case B, the camera is wound up, and the photographer desires to take pictures. As the first step, the snap fastener 22 is disengaged from its stud 23. Next, the outer or auxiliary cover D is lowered, as suggested in Figure 2, to expose the lens 1, front viewing windows 2 and operating button 3. The photographer adjusts the speed regulator 4, which is exposed at all times through the cut-away area 26 in the back wall 8b of the case. The photographer looks into the rear viewer 5 so as to observe the object through the front viewing window 2. Actuation of the button 3 will result in the pictures being taken.

When the photographer finishes taking pictures, the outer cover D again is moved into a position to overlie the inner cover C, and the snap fastener 22 is engaged with its stud 23.

The camera is operable without removing it from the case and is protected from the weather. There is no danger in dropping the camera caused by hurriedly removing the camera from its case, as is necessary at the present time.

I claim:

1. In a motion picture camera case; a pair of spaced-apart sides; a strip of material secured to the sides and forming a top, back and bottom for the case; the front of the case having an opening therein through which a motion picture camera may be inserted into the case, or withdrawn therefrom; a main cover securable over the opening in the front; the main cover having a cut-away area positioned to expose a lens and front viewing window of the motion picture camera; the back having a cut-away area positioned to expose a rear viewer of the camera; and an auxiliary cover swingably secured to the main cover and being movable into a position to form a closure over the cut-away area in the main cover; the auxiliary cover being swingable to expose the lens and front viewing window.

2. In a motion picture camera case; a pair of spaced-apart sides; a strip of material secured to the sides and forming a top, back and bottom for the case; the front of the case having an opening therein through which a motion picture camera may be inserted into the case, or withdrawn therefrom; a main cover securable over the opening in the front; the main cover having a cut-away area positioned to expose a lens and front viewing window of the motion picture camera; the back having a cut-away area positioned to expose a rear view of the camera; an auxiliary cover swingably secured at one of its ends to the main cover and being movable into a position to form a closure over the cut-away area in the main cover; the auxiliary cover being swingable to expose the lens and front viewing window; a flap swingably secured to the strip of material and being movable into a position to overlie the free end of the auxiliary cover; and means for fastening the flap to the auxiliary cover.

3. In a motion picture camera case; a pair of spaced-apart sides; a strip of material secured to the sides and forming a top, back and bottom for the case; the front of the case having an opening therein through which a motion picture camera may be inserted into the case, or withdrawn therefrom; a main cover securable over the opening in the front; the main cover having a cut-away area positioned to expose a lens and front viewing window of the motion picture camera; the back having a cut-away area positioned to expose a rear viewer of the camera; the case including cut-away areas through which an operating button and a speed regulator of the camera may be exposed; and an auxiliary cover swingably secured to the main cover and being movable into a position to form a closure over the cut-away area in the main cover; the auxiliary cover being swingable to expose the cut-away area in the main cover.

4. In a motion picture camera case; a pair of spaced-apart sides; a strip of material secured to the sides and forming a top, back and bottom for the case; the front of the case having an opening therein through which a motion picture camera may be inserted into the case, or withdrawn therefrom; a main cover securable over the opening in the front; the main cover having a cut-away area positioned to expose operating parts of the motion picture camera; and an auxiliary cover swingably secured to the main cover and being movable into a position to form a closure over the cut-away area in the main cover; the auxiliary cover having pieces that fit over the sides when the auxiliary cover forms a closure over the cut-away area in the main cover; said pieces providing stiffeners for the auxiliary cover; the auxiliary cover being swingable to expose said operating parts of the camera.

5. In a motion picture camera case; a pair of spaced-apart sides; a strip of material secured to the sides and forming a top, back and bottom for the case; the front of the case having an opening therein through which a motion picture camera may be inserted into the case, or withdrawn therefrom; a main cover securable over the opening in the front; the main cover having a cut-away area positioned to expose operating parts of the motion picture camera; an auxiliary cover swingably secured at one of its ends to the main cover and being movable into a position to form a closure over the cut-away area in the main cover; the auxiliary cover having pieces that fit over the sides when the auxiliary cover forms a closure over the cut-away area in the main cover; said pieces providing stiffeners for the auxiliary cover; the auxiliary cover being swingable to expose said operating parts of the camera; a flap swingably secured to the strip of material and being movable into a position to overlie the free end of the auxiliary cover; and means for fastening the flap to the auxiliary cover.

CHARLES W. COON.

REFERENCES CITED

The following references are of record in the file of this patent:

UNITED STATES PATENTS

| Number | Name | Date |
|---|---|---|
| 1,042,963 | Peterson | Oct. 29, 1912 |
| 1,478,202 | Cadwell | Dec. 18, 1923 |
| 1,507,915 | Goldsmith | Sept. 9, 1924 |
| 1,513,176 | Lyde | Oct. 28, 1924 |
| 1,918,813 | Kinzy | July 18, 1933 |
| 2,290,307 | Wicker | July 21, 1942 |
| 2,447,053 | Bolsey | Aug. 17, 1948 |

FOREIGN PATENTS

| Number | Country | Date |
|---|---|---|
| 545,233 | Germany | Feb. 26, 1932 |